(12) United States Patent
Ogasawara et al.

(10) Patent No.: US 11,264,633 B2
(45) Date of Patent: Mar. 1, 2022

(54) MANIFOLD AND CELL STACK DEVICE

(71) Applicant: NGK INSULATORS, LTD., Nagoya (JP)

(72) Inventors: Noriyuki Ogasawara, Nagoya (JP); Yuki Tanaka, Nagoya (JP); Masayuki Shinkai, Aichi (JP); Hirofumi Kan, Nagoya (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 247 days.

(21) Appl. No.: 16/558,767

(22) Filed: Sep. 3, 2019

(65) Prior Publication Data

US 2020/0083554 A1 Mar. 12, 2020

Related U.S. Application Data

(63) Continuation of application No. PCT/JP2019/008430, filed on Mar. 4, 2019.

(30) Foreign Application Priority Data

Sep. 7, 2018 (JP) .............................. JP2018-168130

(51) Int. Cl.
  *H01M 8/2484* (2016.01)
(52) U.S. Cl.
  CPC ................................ *H01M 8/2484* (2016.02)
(58) Field of Classification Search
  None
  See application file for complete search history.

(56) References Cited

U.S. PATENT DOCUMENTS

| 5,786,105 A | 7/1998 | Matsushima et al. |
| 10,727,524 B2 | 7/2020 | Ogasawara et al. |

(Continued)

FOREIGN PATENT DOCUMENTS

| JP | H09-102323 A | 4/1997 |
| JP | 2011-060747 A | 3/2011 |

(Continued)

OTHER PUBLICATIONS

English Translation of the International Preliminary Report on Patentability, issued in corresponding International Application No. PCT/JP2019/008430, dated Mar. 18, 2021 (6 pages).

(Continued)

*Primary Examiner* — Michael L Dignan
(74) *Attorney, Agent, or Firm* — Flynn Thiel, P.C.

(57) ABSTRACT

A manifold includes first and second manifold main bodies. The first manifold main body includes a gas supply chamber that is connected to a first gas channel and the second manifold main body includes a gas collection chamber that is connected to a second gas channel. The first manifold main body includes a top plate, a first bottom plate, and a first side plate. The top plate includes a first through hole for connecting the first gas channel and the gas supply chamber. The second manifold main body includes the top plate, a second bottom plate, and a second side plate. The top plate also includes a second through hole for connecting the second gas channel and the gas collection chamber. The first bottom plate and the second bottom plate are constituted by members that are separate from each other.

3 Claims, 9 Drawing Sheets

(56) References Cited

U.S. PATENT DOCUMENTS

| | | | |
|---|---|---|---|
| 10,862,138 B2 | 12/2020 | Ogasawara et al. | |
| 2011/0065022 A1* | 3/2011 | Min | H01M 8/243 |
| | | | 429/497 |
| 2016/0164128 A1* | 6/2016 | Ono | H01M 8/2432 |
| | | | 429/418 |
| 2017/0141426 A1* | 5/2017 | Ohmori | H01M 8/2484 |
| 2017/0155165 A1 | 6/2017 | Ohmori et al. | |
| 2020/0036015 A1 | 1/2020 | Ogasawara et al. | |
| 2020/0067124 A1 | 2/2020 | Ogasawara et al. | |
| 2021/0043962 A1 | 2/2021 | Ogasawara et al. | |

FOREIGN PATENT DOCUMENTS

| | | |
|---|---|---|
| JP | 2015-053186 A | 3/2015 |
| JP | 6030260 B1 | 10/2016 |
| JP | 2017-017025 A | 1/2017 |

OTHER PUBLICATIONS

International Search Report corresponding to PCT/JP2019/008430, in Japanese, dated Jun. 4, 2019 (3 pages).

Notification of Transmittal of the International Search Report and Written Opinion of the International Searching Authority corresponding to PCT/JP2019/008430, in Japanese, dated Jun. 4, 2019 (2 pages).

Written Opinion of the International Searching Authority corresponding to PCT/JP2019/008430, in Japanese, dated Jun. 4, 2019 (4 pages).

English language International Search Report for corresponding PCT/JP2019/008430, dated Jun. 4, 2019 (2 pages).

\* cited by examiner

MANIFOLD AND CELL STACK DEVICE

CROSS-REFERENCE TO RELATED APPLICATIONS

This is a continuation of PCT/JP2019/008430, filed Mar. 4, 2019, which claims priority from Japanese Application No. 2018-168130, filed Sep. 7, 2018, the entire contents of which are hereby incorporated by reference.

TECHNICAL FIELD

The present invention relates to a manifold and a cell stack device.

BACKGROUND ART

A cell stack device includes an electrochemical cell and a manifold. In a cell stack device disclosed in Patent Literature 1, a manifold supports base end portions of fuel cells, which are examples of the electrochemical cell. The manifold includes a gas supply chamber and a gas collection chamber. Specifically, the manifold includes a manifold main body having an internal space, and a partition plate. The partition plate extends from a bottom plate of the manifold main body toward a top plate of the manifold main body and partitions the internal space of the manifold main body into the gas supply chamber and the gas collection chamber.

CITATION LIST

Patent Literature

Patent Literature 1: Japanese Patent No. 6030260

SUMMARY

Technical Problem

The temperature of a cell stack device increases during operation and thus a partition plate thermally expands in some cases. Because the partition plate is in contact with the top plate of the manifold, there is a risk that the top plate will deform due to the partition plate undergoing thermal expansion and pressing the top plate. If the top plate deforms, a problem may arise that a crack occurs in a base end portion of an electrochemical cell supported by the top plate or a bonding material for bonding an electrochemical cell to the top plate. Thus, it is preferable to inhibit the deformation of the top plate. In view of this, the present invention aims to provide a manifold and a cell stack device capable of inhibiting the deformation of a top plate.

Solution to Problem

A manifold according to a first aspect of the present invention is a manifold for supplying a gas to an electrochemical cell. The electrochemical cell includes first and second gas channels. The first and second gas channels extend from a base end portion of the electrochemical cell to a leading end portion of the electrochemical cell and are connected to each other at the leading end portion of the electrochemical cell. The manifold includes a first manifold main body and a second manifold main body. The first manifold main body includes a gas supply chamber that is connected to the first gas channel. The second manifold main body includes a gas collection chamber that is connected to the second gas channel. The first manifold main body includes a first top plate, a first bottom plate, and a first side plate. The first top plate includes a first through hole for connecting the first gas channel and the gas supply chamber. The second manifold main body includes a second top plate, a second bottom plate, and a second side plate. The second top plate includes a second through hole for connecting the second gas channel and the gas collection chamber. The first bottom plate and the second bottom plate are constituted by members that are separate from each other.

With this configuration, the bottom plate of the manifold is divided into the first bottom plate and the second bottom plate, and thus is more likely to deform, compared to a bottom plate constituted by a single plate as in a conventional configuration. Thus, when the first and second side plates thermally expand due to thermal expansion, a force by which the first and second side plates press the first and second top plates is reduced through the deformation of the first and second bottom plates. As a result, it is possible to inhibit the deformation of the first and second top plates.

Preferably, the first top plate and the second top plate are constituted by one member.

Preferably, the first through hole and the second through hole are constituted as a single hole.

Preferably, the first top plate and the second top plate are constituted by separate members.

A cell stack device according to a second aspect of the present invention includes an electrochemical cell and any of the above-described manifolds. The manifold is configured to support a base end portion of the electrochemical cell. The electrochemical cell includes at least one first gas channel and at least one second gas channel. The first gas channel is connected to the gas supply chamber. The first gas channel extends from the base end portion to a leading end portion of the electrochemical cell. The second gas channel is connected to the gas collection chamber. The second gas channel extends from the base end portion to the leading end portion of the electrochemical cell. The first gas channel and the second gas channel are connected to each other in the leading end portion of the electrochemical cell.

Advantageous Effects

According to the present invention, it is possible to provide a manifold and a cell stack device capable of inhibiting the deformation of a top plate.

DESCRIPTION OF EMBODIMENTS

Figure 1:
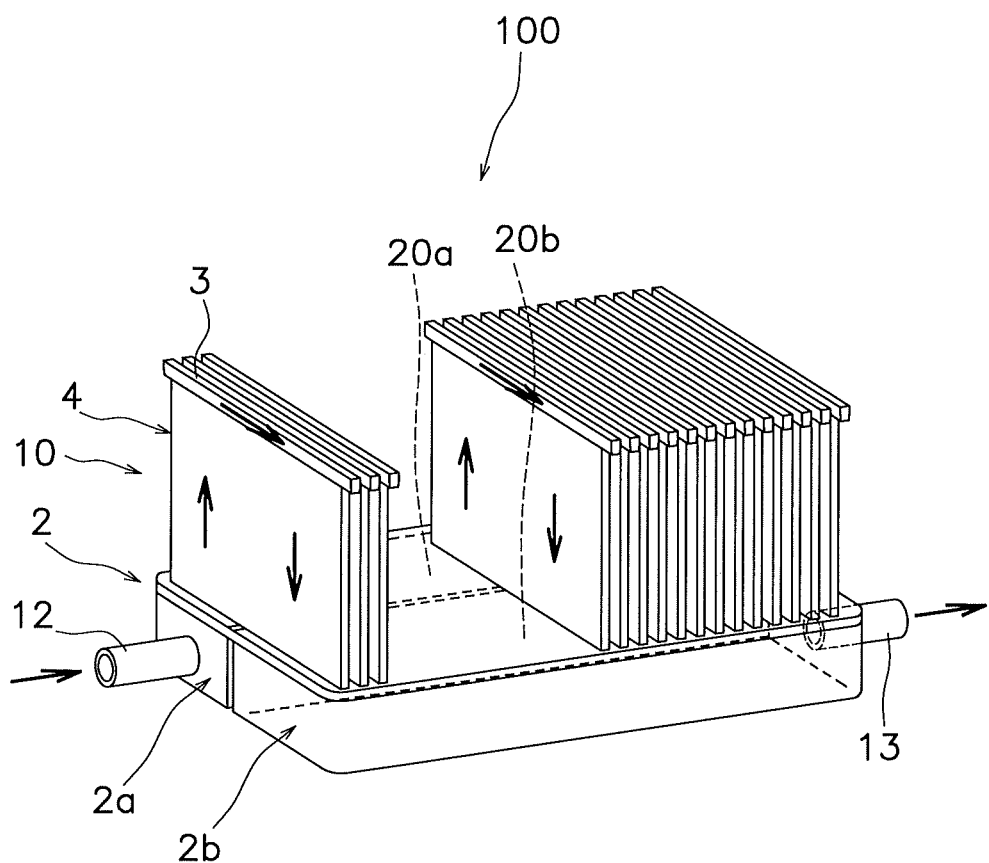
FIG. 1 is a perspective view of a cell stack device.
Figure 2:
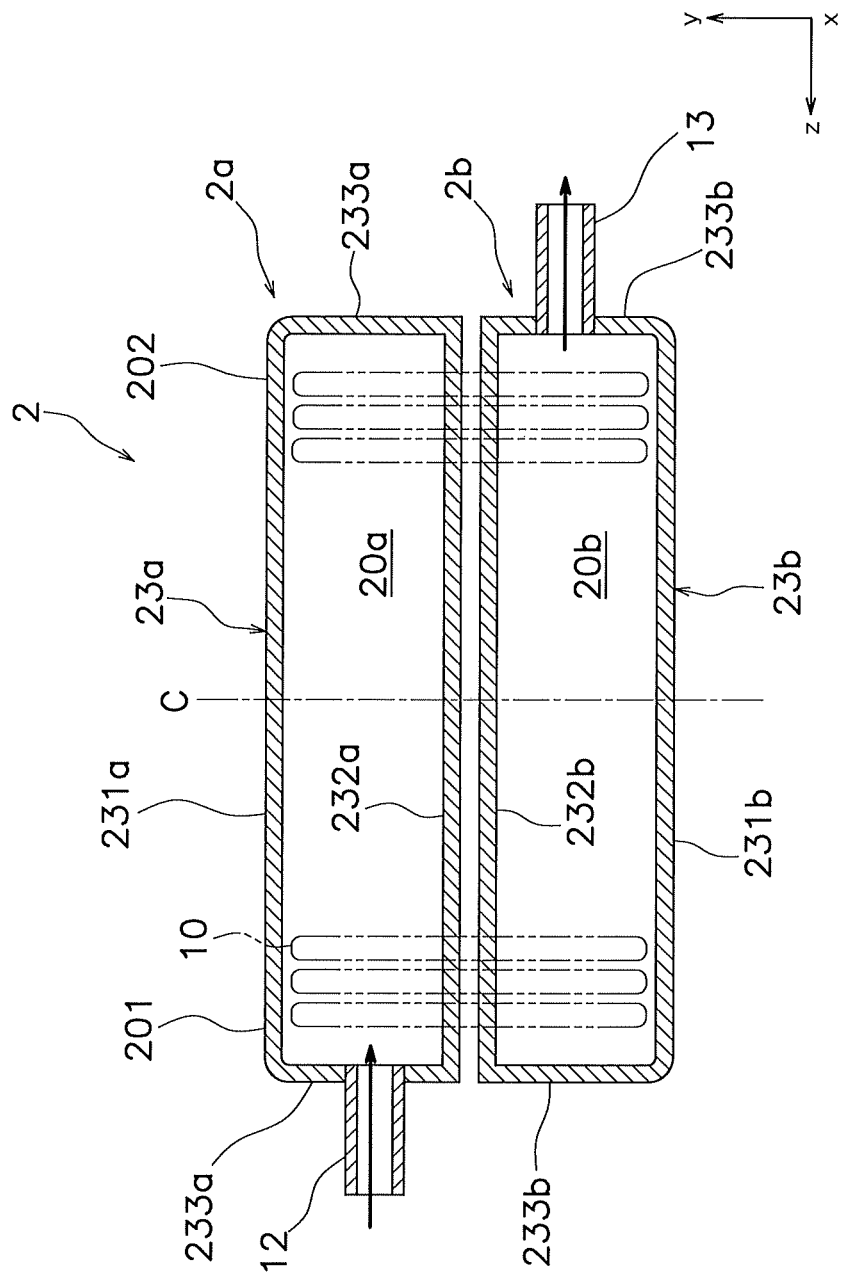
FIG. 2 is a cross-sectional view of a manifold.

Hereinafter, the embodiments of a manifold and a cell stack device according to the present invention will be described with reference to the drawings. Note that this embodiment will be described using, as one example of an electrochemical cell, a fuel cell, more specifically, a solid oxide fuel cell (SOFC). FIG. 1 is a perspective view showing a cell stack device and FIG. 2 is a cross-sectional view of a manifold. Note that some fuel cells are not shown in FIGS. 1 and 2.

Cell Stack Device

As shown in FIG. 1, a cell stack device 100 includes a manifold 2 and a plurality of fuel cells 10.

Manifold

The manifold 2 is configured to supply a gas to the fuel cells 10. Also, the manifold 2 is configured to collect a gas ejected from the fuel cells 10.

Figure 3:
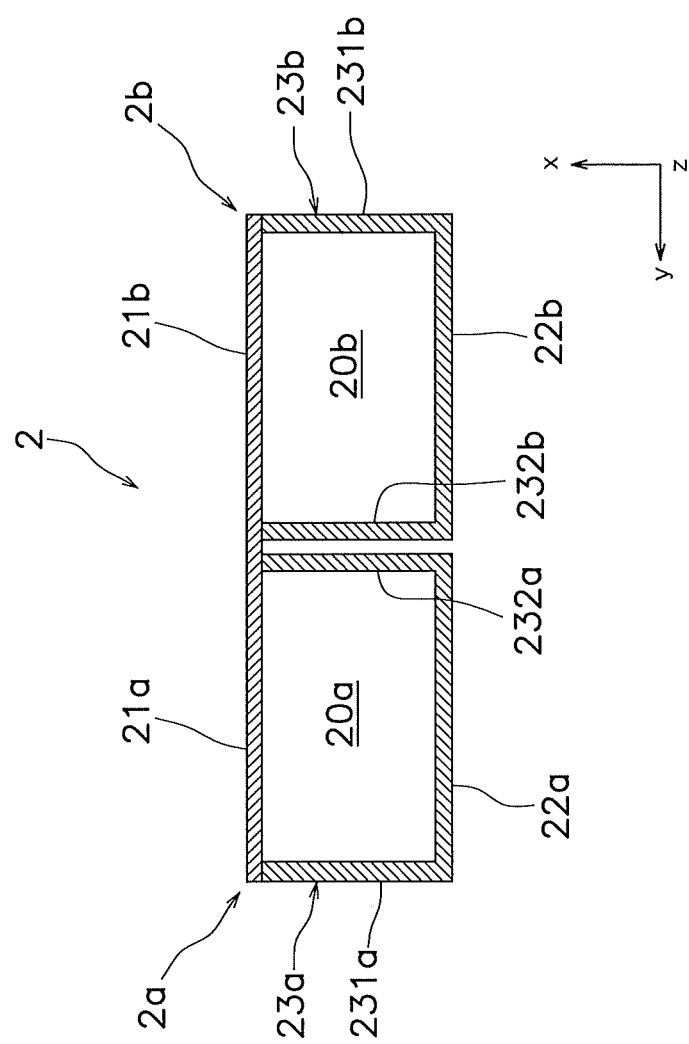
FIG. 3 is a cross-sectional view of the manifold.

As shown in FIGS. 2 and 3, the manifold 2 includes a first manifold main body 2a and a second manifold main body 2b. The first manifold main body 2a includes a gas supply chamber 20a. The second manifold main body 2b includes a gas collection chamber 20b.

The gas supply chamber 20a and the gas collection chamber 20b extend in an arrangement direction (the Z-axis direction) of the fuel cells 10. The manifold 2 includes a first end portion 201 and a second end portion 202 in the arrangement direction of the fuel cells 10. Note that a center line C shown in FIG. 2 indicates a center C of the manifold 2 in the arrangement direction.

Specifically, the first manifold main body 2a includes a first top plate 21a, a first bottom plate 22a, and a first side plate 23a. The gas supply chamber 20a is defined by the first top plate 21a, the first bottom plate 22a, and the first side plate 23a. The first manifold main body 2a has a rectangular parallelepiped shape.

For example, the first bottom plate 22a and the first side plate 23a are constituted by one member. The first top plate 21a is joined to an upper end portion of the first side plate 23a. Note that a configuration may be adopted in which the first top plate 21a and the first side plate 23a are constituted by one member and the first bottom plate 22a is joined to a lower end portion of the first side plate 23a.

The first side plate 23a includes a first outer side plate portion 231a and a first inner side plate portion 232a. The first outer side plate portion 231a and the first inner side plate portion 232a extend in the arrangement direction (the Z-axis direction) of the fuel cells 10. The first outer side plate portion 231a is disposed on the opposite side of the second manifold main body 2b. The first inner side plate portion 232a is disposed on the second manifold main body 2b side.

Also, the first side plate 23a includes a pair of first linking side plate portions 233a. The first linking side plate portions 233a extend in a width direction (the Y-axis direction) of the fuel cell 10. The first linking side plate portions 233a each link an end portion of the first outer side plate portion 231a and an end portion of the first inner side plate portion 232a.

The first outer side plate portion 231a, the first inner side plate portion 232a, and the pair of first linking side plate portions 233a may be constituted by one member. Also, a configuration may be adopted in which only the first inner side plate portion 232a is constituted by a separate member and the first outer side plate portion 231a and the pair of first linking side plate portions 233a are constituted by one member.

Figure 4:
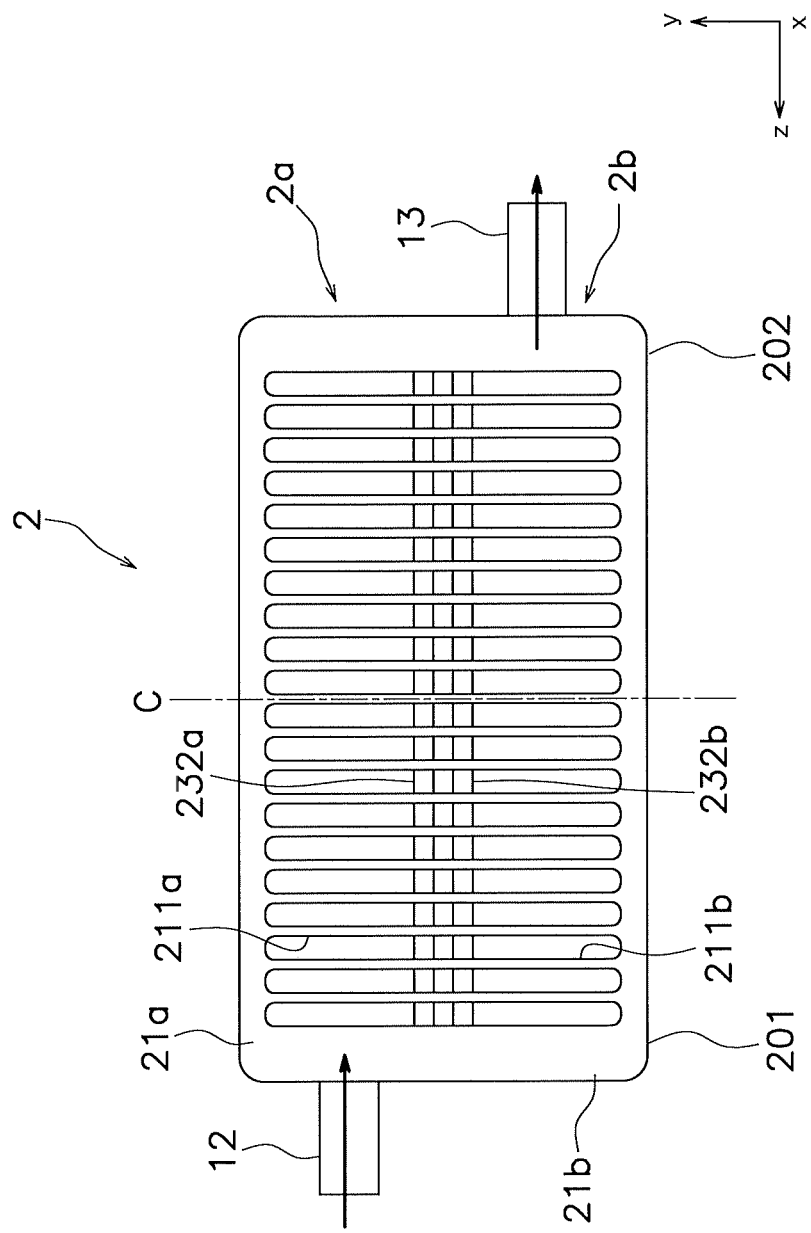
FIG. 4 is a plan view of the manifold.

As shown in FIG. 4, the first top plate 21a has a plurality of first through holes 211a. The first through holes 211a are arranged at intervals in a length direction (the Z-axis direction) of the manifold 2. An arrangement direction (the Z-axis direction) of the first through holes 211a is the same as the arrangement direction of the fuel cells 10.

The first through holes 211a extend in a width direction (the Y-axis direction) of the manifold 2. The first through holes 211a are in communication with the gas supply chamber 20a. Note that the first through holes 211a are respectively formed as single holes with the second through holes 211b, which will be described later.

As shown in FIGS. 2 and 3, the second manifold main body 2b includes a second top plate 21b, a second bottom plate 22b, and a second side plate 23b. The gas collection chamber 20b is defined by the second top plate 21b, the second bottom plate 22b, and the second side plate 23b. The second manifold main body 2b has a rectangular parallelepiped shape.

For example, the second bottom plate 22b and the second side plate 23b are constituted by one member. The second top plate 21b is joined to an upper end portion of the second side plate 23b. Note that a configuration may be adopted in which the second top plate 21b and the second side plate 23b are constituted by one member and the second bottom plate 22b is joined to a lower end portion of the second side plate 23b.

The second side plate 23b includes a second outer side plate portion 231b and a second inner side plate portion 232b. The second outer side plate portion 231b and the second inner side plate portion 232b extend in the arrangement direction (the Z-axis direction) of the fuel cells 10. The second outer side plate portion 231b is disposed on the opposite side of the first manifold main body 2a. The second inner side plate portion 232b is disposed on the first manifold main body 2a side. The second inner side plate portion 232b faces the first inner side plate portion 232a. Preferably, the first inner side plate portion 232a and the second inner side plate portion 232b are disposed spaced apart from each other.

Also, the second side plate 23b includes a pair of second linking side plate portions 233b. The second linking side plate portions 233b extend in the width direction (the Y-axis direction) of the fuel cell 10. The second linking side plate portions 233b each link an end portion of the second outer side plate portion 231b and an end portion of the second inner side plate portion 232b.

The second outer side plate portion 231b, the second inner side plate portion 232b, and the pair of second linking side plate portions 233b may be constituted by one member. Also, a configuration may be adopted in which only the second inner side plate portion 232b is constituted by a separate member and the second outer side plate portion 231b and the pair of second linking side plate portions 233b are constituted by one member.

The second bottom plate 22b is constituted by a member that is separate from the first bottom plate 22a. Preferably, the first bottom plate 22a and the second bottom plate 22b are disposed spaced apart from each other.

The second top plate 21b is constituted as a single body with the first top plate 21a. For example, the first top plate 21a and the second top plate 21b may be constituted by a single plate-shaped member. In this case, a portion of the single plate-shaped member that faces the gas supply chamber 20a serves as the first top plate 21a, and a portion thereof that faces the gas collection chamber 20b serves as the second top plate 21b.

As shown in FIG. 4, the second top plate 21b has a plurality of second through holes 211b. The second through holes 211b are arranged at intervals in the length direction (the Z-axis direction) of the manifold 2. An arrangement direction (the Z-axis direction) of the second through holes 211*b* is the same as the arrangement direction of the fuel cells 10.

The second through holes 211*b* extend in the width direction (the Y-axis direction) of the manifold 2. The second through holes 211*b* are in communication with the gas collection chamber 20*b*. Note that as described above, the second through holes 211*b* are respectively formed as single holes with the first through holes 211*a*.

Figure 5:
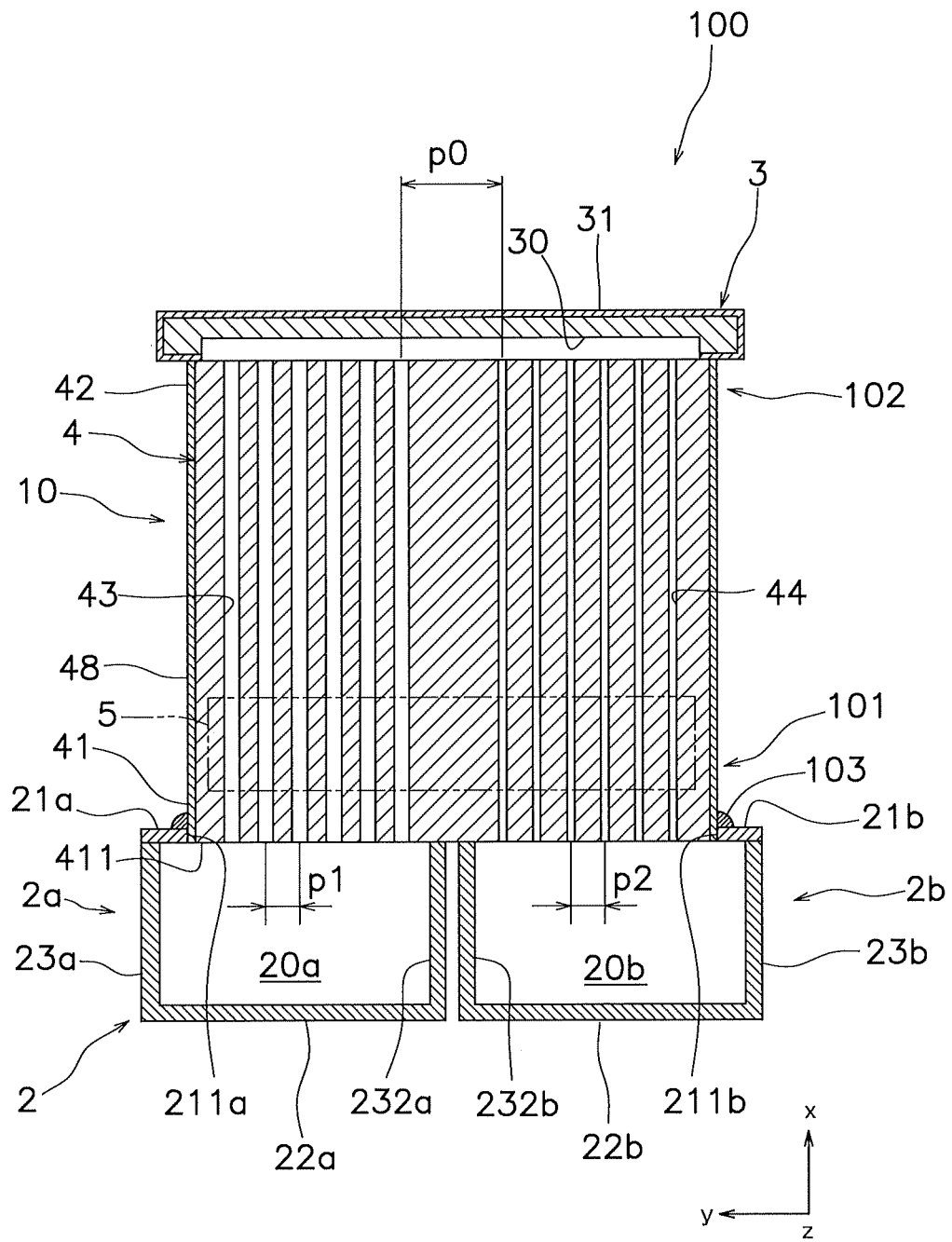
FIG. 5 is a cross-sectional view of the cell stack device.

As shown in FIG. 5, the first and second top plates 21*a* and 21*b* support the base end portions 101 of the fuel cells 10. Specifically, the bonding material 103 bonds the first and second top plates 21*a* and 21*b* and the base end portion 101 of the fuel cell 10. The bonding material 103 is formed into an annular shape extending along the periphery of the base end portion 101 of the fuel cell 10. Note that the first and second top plates 21*a* and 21*b* may directly support the fuel cell 10 as in this embodiment or indirectly support the fuel cell 10 via another member between the fuel cell 10 and the top plates.

Gas Supply Pipe

As shown in FIG. 2, the gas supply pipe 12 is configured to supply a gas to the gas supply chamber 20*a*. The gas supply pipe 12 is connected to the gas supply chamber 20*a*. Specifically, the gas supply pipe 12 is connected to the gas supply chamber 20*a* on the first end portion 201 side with respect to the center C of the manifold 2, in the arrangement direction (the Z-axis direction) of the fuel cells 10.

The gas supply pipe 12 is attached to the first manifold main body 2*a*. Specifically, the gas supply pipe 12 is attached to the first linking side plate portion 233*a*, for example. Note that the gas supply pipe 12 supplies gas from the first linking side plate portion 233*a* in the arrangement direction of the fuel cells 10. That is, the direction in which the gas is supplied by the gas supply pipe 12 is along the arrangement direction of the fuel cells 10.

Gas Collection Pipe

The gas collection pipe 13 is configured to collect the gas from the gas collection chamber 20*b*. The gas collection pipe 13 is connected to the gas collection chamber 20*b*. The gas collection pipe 13 is connected to the gas collection chamber 20*b* on the second end portion 202 side with respect to the center C of the manifold 2, in the arrangement direction of the fuel cells 10.

The gas collection pipe 13 is attached to the second manifold main body 2*b*. Specifically, the gas collection pipe 13 is attached to the second linking side plate portion 233*b*, for example. Note that the second linking side plate portion 233*b* to which the gas collection pipe 13 is attached is disposed opposite to the first linking side plate portion 233*a* to which the gas supply pipe 12 is attached.

The gas collection pipe 13 collects the gas from the second linking side plate portion 233*b* in the arrangement direction of the fuel cells 10. That is, the direction in which the gas is collected by the gas collection pipe 13 is along the arrangement direction of the fuel cells 10 are arranged.

The gas supply pipe 12 supplies gas in the direction in which gas is collected by the gas collection pipe 13. That is, the direction in which gas is supplied by the gas supply pipe 12 is substantially the same as the direction in which gas is collected by the gas collection pipe 13.

Fuel Cell

As shown in FIG. 5, the fuel cell 10 extends upward from the manifold 2. Specifically, the base end portion 101 of the fuel cell 10 is attached to the manifold 2. In this embodiment, the base end portion 101 of the fuel cell 10 refers to a lower end portion and the leading end portion 102 of the fuel cell 10 refers to an upper end portion.

As shown in FIG. 1, the fuel cells 10 are arranged such that main surfaces of the fuel cells 10 face each other. Also, the fuel cells 10 are arranged at intervals in the length direction (the Z-axis direction) of the manifold 2. That is, the arrangement direction of the fuel cells 10 is along the length direction of the manifold 2. Note that the fuel cells 10 need not be disposed at equal intervals in the length direction of the manifold 2.

Figure 6:
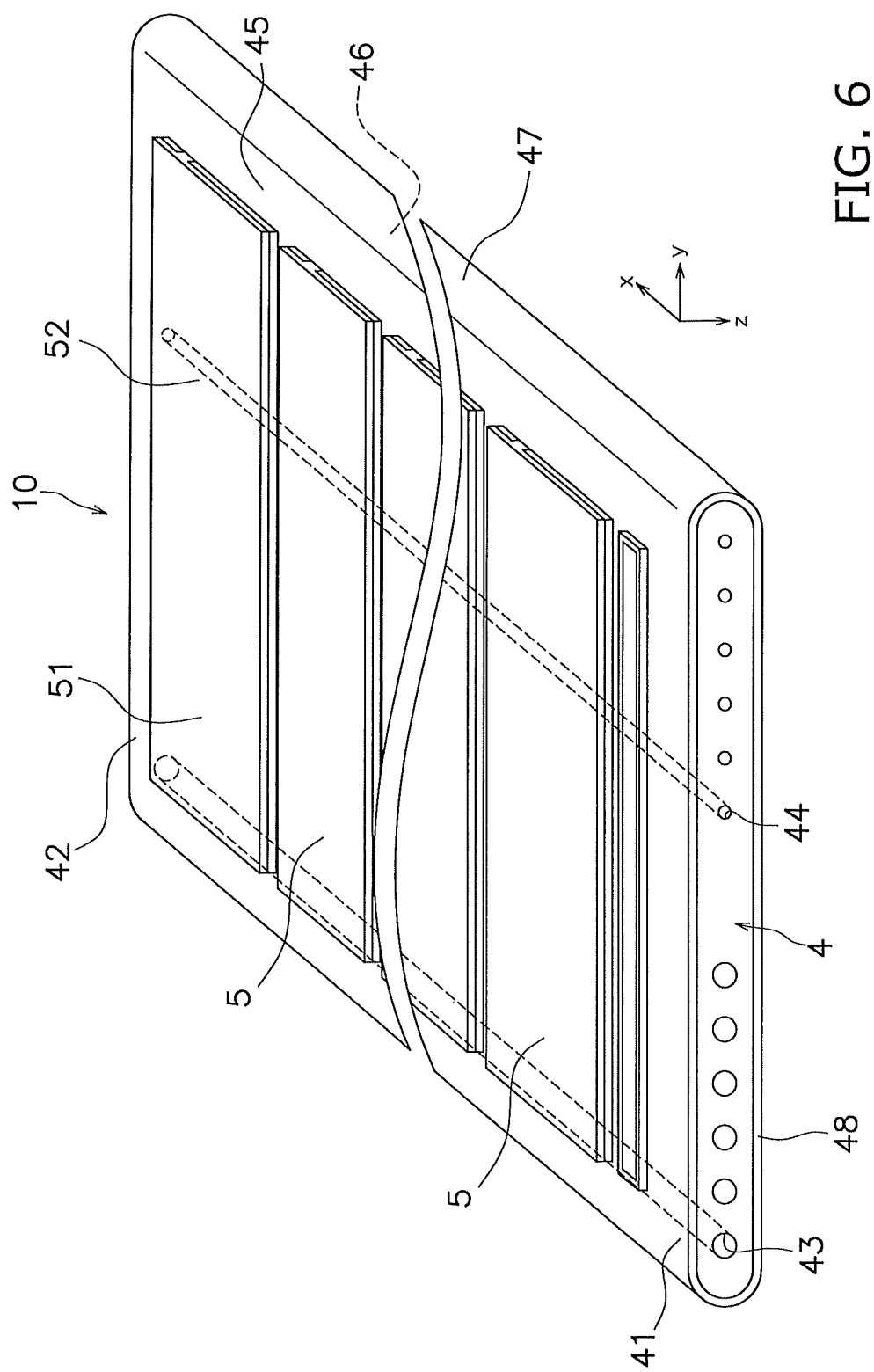
FIG. 6 is a perspective view of a fuel cell.

As shown in FIGS. 5 and 6, the fuel cells 10 each include a support substrate 4, a plurality of power generation element portions 5, and a connection member 3. The power generation element portions 5 are supported on a first main surface 45 and a second main surface 46 of the support substrate 4. Note that the number of power generation element portions 5 formed on the first main surface 45 and the number of power generation element portions 5 formed on the second main surface 46 may be the same or different from each other. Also, the power generation element portions 5 may have different sizes.

Support Substrate

The support substrate 4 extends from the manifold 2 in the vertical direction. Specifically, the support substrate 4 extends upward from the manifold 2. The support substrate 4 has a flat shape and has a base end portion 41 and a leading end portion 42. The base end portion 41 and the leading end portion 42 are both end portions of the support substrate 4 in the length direction (the X-axis direction). In this embodiment, the base end portion 41 of the support substrate 4 refers to a lower end portion and the leading end portion 42 of the support substrate 4 refers to an upper end portion.

The base end portion 41 of the support substrate 4 is attached to the manifold 2. For example, the base end portion 41 of the support substrate 4 is attached to the first and second top plates 21*a* and 21*b* of the manifold 2 with the use of the bonding material 103 or the like. Specifically, the base end portion 41 of the support substrate 4 is inserted into the first and second through holes 211*a* and 211*b* formed in the first and second top plates 21*a* and 21*b*. Note that the base end portion 41 of the support substrate 4 need not be inserted into the first and second through holes 211*a* and 211*b*.

The support substrate 4 includes a plurality of first gas channels 43 and a plurality of second gas channels 44. The first gas channels 43 extend in the vertical direction in the support substrate 4. That is, the first gas channels 43 extend in the length direction (the X-axis direction) of the support substrate 4. The first gas channels 43 pass through the support substrate 4. The first gas channels 43 are disposed at intervals in the width direction (the Y-axis direction) of the support substrate 4. Note that the first gas channels 43 are preferably disposed at equal intervals. The length of the support substrate 4 in the width direction (the Y-axis direction) may be longer than the length of the support substrate 4 in the length direction (the X-axis direction).

As shown in FIG. 5, a pitch p1 of adjacent first gas channels 43 is about 1 to 5 mm, for example. The pitch p1 of adjacent first gas channels 43 indicates the distance between the centers of the first gas channels 43. For example, an average value of pitches obtained by measuring pitches of first gas channels 43 in the base end portion 41, the central portion, and the leading end portion 42 may be used as the pitch p1 of first gas channels 43.

The first gas channels 43 extend from the base end portion 101 of the fuel cell 10 toward the leading end portion 102. The first gas channels 43 are connected to the gas supply chamber 20*a* of the first manifold main body 2*a* on the base end portion 101 side in a state in which the fuel cell 10 is attached to the manifold 2.

The second gas channels 44 extend in the vertical direction in the support substrate 4. That is, the second gas channels 44 extend in the length direction (the X-axis direction) of the support substrate 4. The second gas channels 44 extend substantially in parallel to the first gas channels 43.

The second gas channels 44 pass through the support substrate 4. The second gas channels 44 are disposed at intervals in the width direction (the Y-axis direction) of the support substrate 4. Note that the second gas channels 44 are preferably disposed at equal intervals.

A pitch p2 of adjacent second gas channels 44 is about 1 to 5 mm, for example. The pitch p2 of adjacent second gas channels 44 indicates the distance between the centers of the second gas channels 44. For example, an average value of pitches obtained by measuring the pitches of second gas channels 44 in the base end portion 41, the central portion, and the leading end portion 42 may be used as the pitch p2 of second gas channels 44. Note that the pitch p2 between second gas channels 44 is preferably substantially equal to the pitch p1 between first gas channels 43.

The second gas channels 44 extend from the base end portion 101 of the fuel cell 10 toward the leading end portion 102. The second gas channels 44 are connected to the gas collection chamber 20*b* of the second manifold main body 2*b* on the base end portion 101 side in a state in which the fuel cell 10 is attached to the manifold 2.

A pitch p0 of a first gas channel 43 and a second gas channel 44 that are adjacent to each other is about 1 to 10 mm, for example. The pitch p0 of the first gas channel 43 and the second gas channel 44 that are adjacent to each other indicates the distance between the center of the first gas channel 43 and the center of the second gas channel 44. For example, the pitch p0 can be measured on a base end surface 411 of the support substrate 4.

The pitch p0 of the first gas channel 43 and the second gas channel 44 that are adjacent to each other is larger than the pitch p1 of adjacent first gas channels 43. Also, the pitch p0 of the first gas channel 43 and the second gas channel 44 that are adjacent to each other is larger than the pitch p2 of adjacent second gas channels 44.

The first gas channels 43 and the second gas channels 44 are connected to each other on the leading end portion 102 side of the fuel cell 10. Specifically, the first gas channels 43 and the second gas channels 44 are connected to each other via a connection channel 30 of the connection member 3.

The first gas channels 43 and the second gas channels 44 are configured such that a pressure loss of gas in the first gas channels 43 is smaller than a pressure loss of gas in the second gas channels 44. Note that, as in this embodiment, if a plurality of first gas channels 43 and a plurality of second gas channels 44 are present, the first gas channels 43 and the second gas channels 44 are configured such that an average value of pressure losses of the gas in the first gas channels 43 is smaller than an, average value of pressure losses of the gas in the second gas channels 44.

For example, the flow channel cross-sectional area of each first gas channel 43 can be larger than the flow channel cross-sectional area of each second gas channel 44. Note that, if the number of first gas channels 43 is different from the number of second gas channels 44, the sum of the flow channel cross-sectional areas of the first gas channels 43 can be larger than the sum of the flow channel cross-sectional areas of the second gas channels 44.

The sum of the flow channel cross-sectional areas of the second gas channels 44, although not particularly limited, may be set to about 20% to 95% of the sum of the flow channel cross-sectional areas of the first gas channels 43. Note that the flow channel cross-sectional area of a first gas channel 43 may be set to about 0.5 to 20 mm$^2$, for example. Also, the flow channel cross-sectional area of a second gas channel 44 may be set to about 0.1 to 15 mm$^2$, for example.

Note that the flow channel cross-sectional area of the first gas channel 43 refers to the flow channel cross-sectional area of the first gas channel 43 on the cross-section obtained by cutting the first gas channel 43 along a plane (the YZ plane) orthogonal to a direction (the X-axis direction) in which the first gas channel 43 extends. Also, an average value of the flow channel cross-sectional area at any position on the base end portion 41 side, the flow channel cross-sectional area at any position of the central portion, and the flow channel cross-sectional area at any position on the leading end portion 42 side can be used as the flow channel cross-sectional area of the first gas channel 43.

Also, the flow channel cross-sectional area of the second gas channel 44 refers to the flow channel cross-sectional area of the second gas channel 44 on the cross-section obtained by cutting the second gas channel 44 along a plane (the YZ plane) orthogonal to a direction (the X-axis direction) in which the second gas channel 44 extends. Also, an average value of the flow channel cross-sectional area at any position on the base end portion 41 side, the flow channel cross-sectional area at any position of the central portion, and the flow channel cross-sectional area at any position on the leading end portion 42 side can be used as the flow channel cross-sectional area of the second gas channel 44.

As shown in FIG. 6, the support substrate 4 includes a first main surface 45 and a second main surface 46. The first main surface 45 and the second main surface 46 face away from each other. The first main surface 45 and the second main surface 46 support the power generation element portions 5. The first main surface 45 and the second main surface 46 are oriented in the thickness direction (the Z-axis direction) of the support substrate 4. Also, side surfaces 47 of the support substrate 4 are oriented in the width direction (the Y-axis direction) of the support substrates 4. The side surfaces 47 may be curved. As shown in FIG. 1, the support substrates 4 are disposed such that the first main surfaces 45 and the second main surfaces 46 face each other.

As shown in FIG. 6, the support substrate 4 supports power generation element portions 5. The support substrate 4 is constituted by a porous material having no electron conductivity. The support substrate 4 is constituted by CSZ (calcia stabilized zirconia), for example. Alternatively, the support substrate 4 may be constituted by NiO (nickel oxide) and YSZ (8YSZ) (yttria-stabilized zirconia), NiO (nickel oxide) and Y$_2$O$_3$ (yttria), or MgO (magnesium oxide) and MgAl$_2$O$_4$ (magnesia alumina spinel). The support substrate 4 has a porosity of about 20% to 60%, for example. The porosity is measured using the Archimedes' method, or through microstructure observation, for example.

The support substrate 4 is covered by a compact layer 48. The compact layer 48 is configured to keep a gas that is diffused from the first gas channels 43 and the second gas channels 44 into the support substrate 4 from being ejected to the outside. In this embodiment, the compact layer 48 covers the first main surface 45, the second main surface 46, and the side surfaces 47 of the support substrate 4. Note that, in this embodiment, the compact layer 48 is constituted by electrolytes 7 and interconnectors 91, which will be described later. The compact layer 48 is more compact than the support substrate 4. For example, the compact layer 48 has a porosity of about 0% to 7%.

Power Generation Element Portion

The plurality of power generation element portions 5 are supported on the first main surface 45 and the second main surface 46 of the support substrate 4. The power generation element portions 5 are arranged in the length direction (the X-axis direction) of the support substrate 4. Specifically, the power generation element portions 5 are disposed at intervals from the base end portion 41 to the leading end portion 42 on the support substrate 4. That is, the power generation element portions 5 are disposed at intervals in the length direction (the X-axis direction) of the support substrate 4. Note that the power generation element portions 5 are connected to each other in series by electrical connection portions 9, which will be described later.

The power generation element portions 5 each extend in the width direction (the Y-axis direction) of the support substrate 4. The power generation element portion 5 is divided into a first portion 51 and a second portion 52 in the width direction of the support substrate 4. Note that there is no strict boundary between the first portion 51 and the second portion 52. For example, in a state in which the fuel cells 10 are attached to the manifold 2, in a longitudinal view (the X-axis view) of the support substrate 4, a portion overlapping the boundary between the gas supply chamber 20a and the gas collection chamber 20b can be referred to as a boundary portion between the first portion 51 and the second portion 52.

In the thickness view (the Z-axis view) of the support substrate 4, the first gas channels 43 overlap the first portions 51 of the power generation element portions 5. Also, in the thickness view (the Z-axis view) of the support substrate 4, the second gas channels 44 overlap the second portions 52 of the power generation element portions 5. Note that some of the first gas channels 43 need not overlap the first portions 51. Similarly, some of the second gas channels 44 need not overlap the second portions 52.

Figure 7:
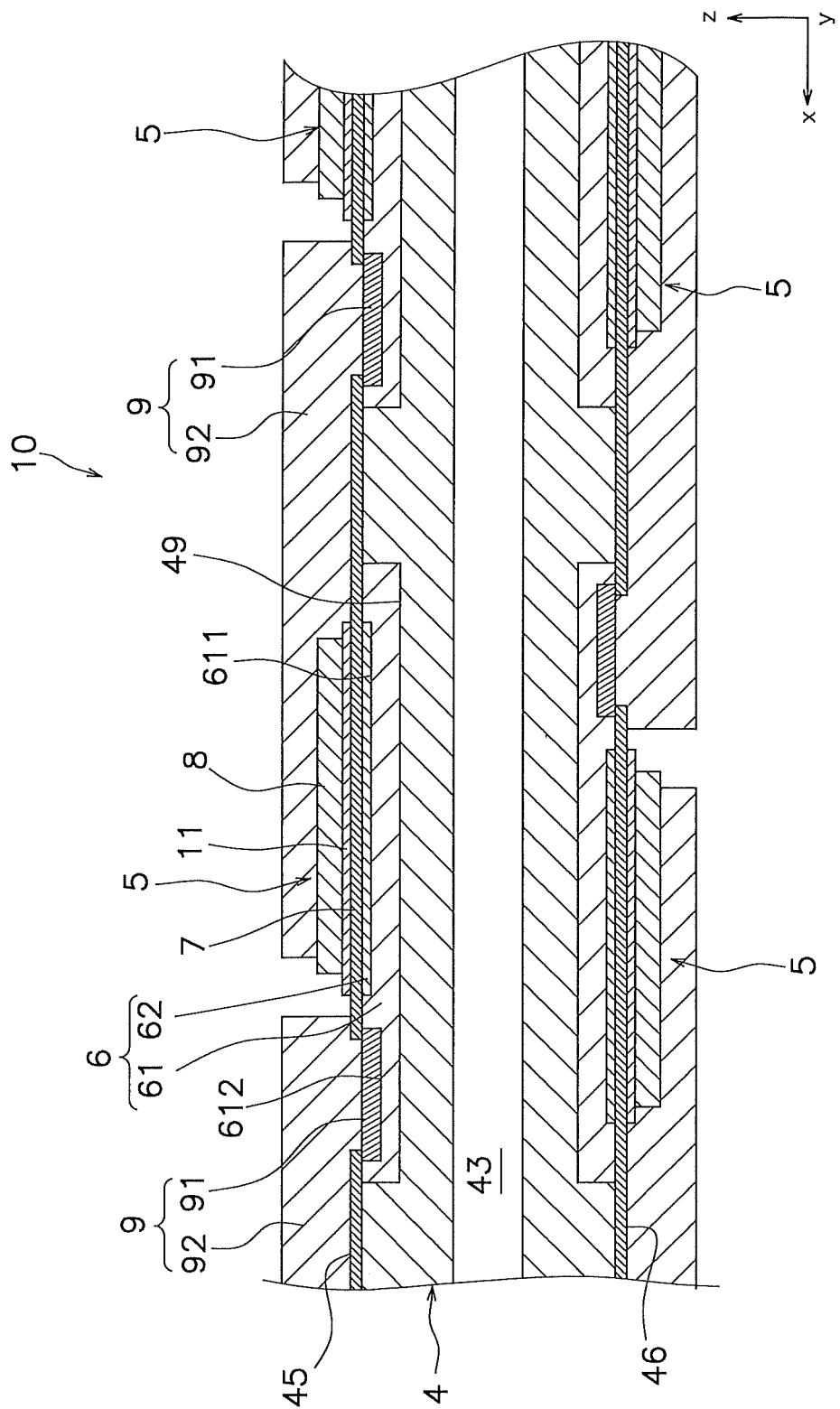
FIG. 7 is a cross-sectional view of the fuel cell.

FIG. 7 is a cross-sectional view of the fuel cell 10 cut along the first gas channel 43. Note that the cross-sectional view of the fuel cell 10 cut along the second gas channel 44 is the same as that in FIG. 7, except that the flow channel cross-sectional area of the second gas channel 44 is different from that in FIG. 7.

The power generation element portions 5 include fuel electrodes 6, the electrolytes 7, and air electrodes 8. Also, the power generation element portions 5 further include reaction preventing films 11. The fuel electrode 6 is a sintered body constituted by a conductive porous material. The fuel electrode 6 includes a fuel electrode current collector portion 61 and a fuel electrode active portion 62.

The fuel electrode current collector portion 61 is disposed in a recess 49. The recess 49 is formed in the support substrate 4. Specifically, the recess 49 is filled with the fuel electrode current collector portion 61 and the fuel electrode current collector portion 61 has the same outer shape as the recess 49. The fuel electrode current collector portions 61 each have a first recess 611 and a second recess 612. The fuel electrode active portion 62 is disposed in the first recess 611. Specifically, the first recess 611 is filled with the fuel electrode active portion 62.

The fuel electrode current collector portion 61 may be constituted by NiO (nickel oxide) and YSZ (8YSZ) (yttria-stabilized zirconia), for example. Alternatively, the fuel electrode current collector portion 61 may also be constituted by NiO (nickel oxide) and $Y_2O_3$ (yttria), or NiO (nickel oxide) and CSZ (calcia stabilized zirconia). The fuel electrode current collector portion 61 has a thickness of about 50 to 500 µm and the recess 49 has a depth of about 50 to 500 µm.

The fuel electrode active portion 62 may be constituted by NiO (nickel oxide) and YSZ (8YSZ) (yttria-stabilized zirconia), for example. Alternatively, the fuel electrode active portion 62 may also be constituted by NiO (nickel oxide) and GDC (gadolinium doped ceria). The fuel electrode active portion 62 has a thickness of 5 to 30 µm.

The electrolyte 7 is disposed covering the fuel electrode 6. Specifically, the electrolyte 7 extends in the length direction from one interconnector 91 to another interconnector 91. That is, the electrolytes 7 and the interconnectors 91 are disposed in an alternating manner in the length direction (the X-axis direction) of the support substrate 4. Also, the electrolytes 7 cover the first main surface 45, the second main surface 46, and the side surfaces 47 of the support substrate 4.

The electrolyte 7 is more compact than the support substrate 4. For example, the electrolyte 7 has a porosity of about 0% to 7%. The electrolyte 7 is a sintered body constituted by a compact material having an ionic conductivity and no electron conductivity. The electrolyte 7 may be constituted by YSZ (8YSZ) (yttria-stabilized zirconia), for example. Alternatively, the electrolyte 7 may also be constituted by LSGM (lanthanum gallate). The electrolyte 7 has a thickness of about 3 to 50 µm, for example.

The reaction preventing film 11 is a sintered body constituted by a compact material. The reaction preventing film 11 has a shape that is substantially the same as that of the fuel electrode active portion 62, in a plan view. The reaction preventing film 11 is disposed at a position corresponding to the fuel electrode active portion 62 via the electrolyte 7. The reaction preventing film 11 is provided in order to suppress the occurrence of a phenomenon in which a reaction layer with a large electric resistance is formed at an interface between the electrolyte 7 and the air electrode 8 through a reaction between YSZ in the electrolyte 7 and Sr in the air electrode 8. The reaction preventing film 11 may be constituted by GDC=(Ce, Gd)$O_2$ (gadolinium doped ceria), for example. The reaction preventing film 11 has a thickness of about 3 to 50 µm, for example.

The air electrode 8 is disposed on the reaction preventing film 11. The air electrode 8 is a sintered body constituted by a conductive porous material. The air electrode 8 may be constituted by LSCF=(La, Sr) (Co, Fe)$O_3$ (lanthanum strontium cobalt ferrite), for example. Alternatively, the air electrode 8 may also be constituted by LSF=(La, Sr)Fe$O_3$ (lanthanum strontium ferrite), LNF=La(Ni, Fe)$O_3$ (lanthanum nickel ferrite), LSC=(La, Sr)Co$O_3$ (lanthanum strontium cobaltite), or the like. Also, the air electrode 8 may be constituted by two layers of a first layer (inner layer) constituted by LSCF and a second layer (outer layer) constituted by LSC. The air electrode 8 has a thickness of 10 to 100 µm, for example.

Electrical Connection Portion

An electrical connection portion 9 is configured to electrically connect adjacent power generation element portions 5. The electrical connection portion 9 includes an interconnector 91 and an air electrode current collector film 92. The interconnector 91 is disposed in the second recess 612. Specifically, the interconnector 91 is embedded in the second recess 612 (the second recess 612 is filled with the interconnector 91). The interconnector 91 is a sintered body constituted by a conductive compact material. The interconnector 91 is more compact than the support substrate 4. For example, the interconnector 91 has a porosity of about 0% to 7%. The interconnector 91 may be constituted by LaCrO₃ (lanthanum chromite), for example. Alternatively, the interconnector 91 may also be constituted by (Sr, La)TiO₃ (strontium titanate). The interconnector 91 has a thickness of 10 to 100 μm, for example.

The air electrode current collector film 92 is disposed to extend between the interconnector 91 and the air electrode 8 of adjacent power generation element portions 5. For example, the air electrode current collector film 92 is disposed such that the air electrode 8 of the power generation element portion 5 disposed on the left side in FIG. 7 and the interconnector 91 of the power generation element portion 5 disposed on the right side in FIG. 7 are electrically connected to each other. The air electrode current collector film 92 is a sintered body constituted by a conductive porous material.

The air electrode current collector film 92 may be constituted by LSCF=(La, Sr) (Co, Fe)O₃ (lanthanum strontium cobalt ferrite), for example. Alternatively, the air electrode current collector film 92 may also be constituted by LSC=(La, Sr)CoO₃ (lanthanum strontium cobaltite). Alternatively, the air electrode current collector film 92 may also be constituted by Ag (silver) or Ag—Pd (a silver palladium alloy). The air electrode current collector film 92 has a thickness of about 50 to 500 for example.

Connection Member

As shown in FIG. 5, the connection member 3 is attached to the leading end portion 42 of the support substrate 4. Also, the connection member 3 includes a connection channel 30 for connecting the first gas channels 43 and the second gas channels 44. Specifically, the connection channel 30 connects the first gas channels 43 and the second gas channels 44. The connection channel 30 is constituted by a space extending from the first gas channels 43 to the second gas channels 44. The connection member 3 is preferably joined to the support substrate 4. Also, the connection member 3 is preferably formed as a single body with the support substrate 4. The number of connection channels 30 is smaller than the number of first gas channels 43. In this embodiment, a plurality of first gas channels 43 and a plurality of second gas channels 44 are connected to each other by only one connection channel 30.

The connection member 3 is a porous member, for example. Also, the connection member 3 includes a compact layer 31 constituting the outer surface thereof. The compact layer 31 is more compact than the main body of the connection member 3. For example, the compact layer 31 has a porosity of about 0% to 7%. This compact layer 31 may be made of the same material as the connection member 3, a material used in the above-described electrolyte 7, crystallized glass, or the like.

Method for Generating Power

In the cell stack device 100 configured as described above, a fuel gas such as hydrogen gas is supplied to the gas supply chamber 20a of the first manifold main body 2a, and the fuel cells 10 are exposed to a gas containing oxygen, such as air. Then, a chemical reaction indicated by Equation (1) below occurs in the air electrode 8, a chemical reaction indicated by Equation (2) occurs in the fuel electrode 6, and a current flows.

$$(\tfrac{1}{2}) \cdot O_2 + 2e^- \rightarrow O^{2-} \tag{1}$$

$$H_2 + O^{2-} \rightarrow H_2O + 2e^- \tag{2}$$

Specifically, a fuel gas supplied from the gas supply pipe 12 to the gas supply chamber 20a flows through the first gas channels 43 of the fuel cells 10 and the chemical reaction indicated by Equation (2) above occurs in the fuel electrodes 6 of the power generation element portions 5. Unreacted fuel gas in the fuel electrodes 6 leaves the first gas channels 43 and is supplied to the second gas channels 44 via the connection channel 30 of the connection member 3. Then, the fuel gas supplied to the second gas channels 44 undergoes the chemical reaction indicated by Equation (2) above in the fuel electrodes 6 again. Unreacted fuel gas in the fuel electrodes 6 in a process in which the fuel gas flows through the second gas channels 44 is collected in the gas collection chamber 20b of the second manifold main body 2b. Then, the gas collection pipe 13 collects gas from the gas collection chamber 20b.

Variations

Although embodiments of the present invention have been described above, the present invention is not limited thereto, and various modifications can be made without departing from the spirit of the present invention.

Variation 1

Figure 8:
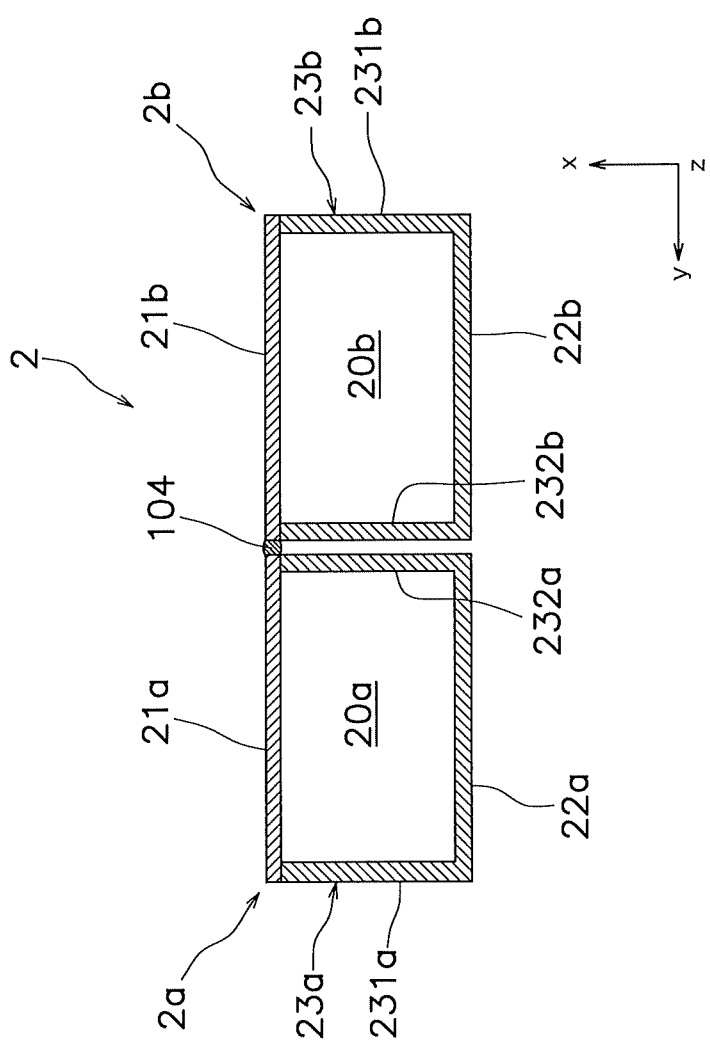
FIG. 8 is a cross-sectional view of a manifold according to a variation.

Although the first top plate 21a and the second top plate 21b are constituted by one member in the above-described embodiment, the configuration thereof is not limited thereto. For example, as shown in FIG. 8, the first top plate 21a and the second top plate 21b may be constituted by separate members. In this case, the first top plate 21a and the second top plate 21b are preferably constituted integrally. For example, the first top plate 21a and the second top plate 21b may be bonded with use of a bonding material 104.

Variation 2

Figure 9:
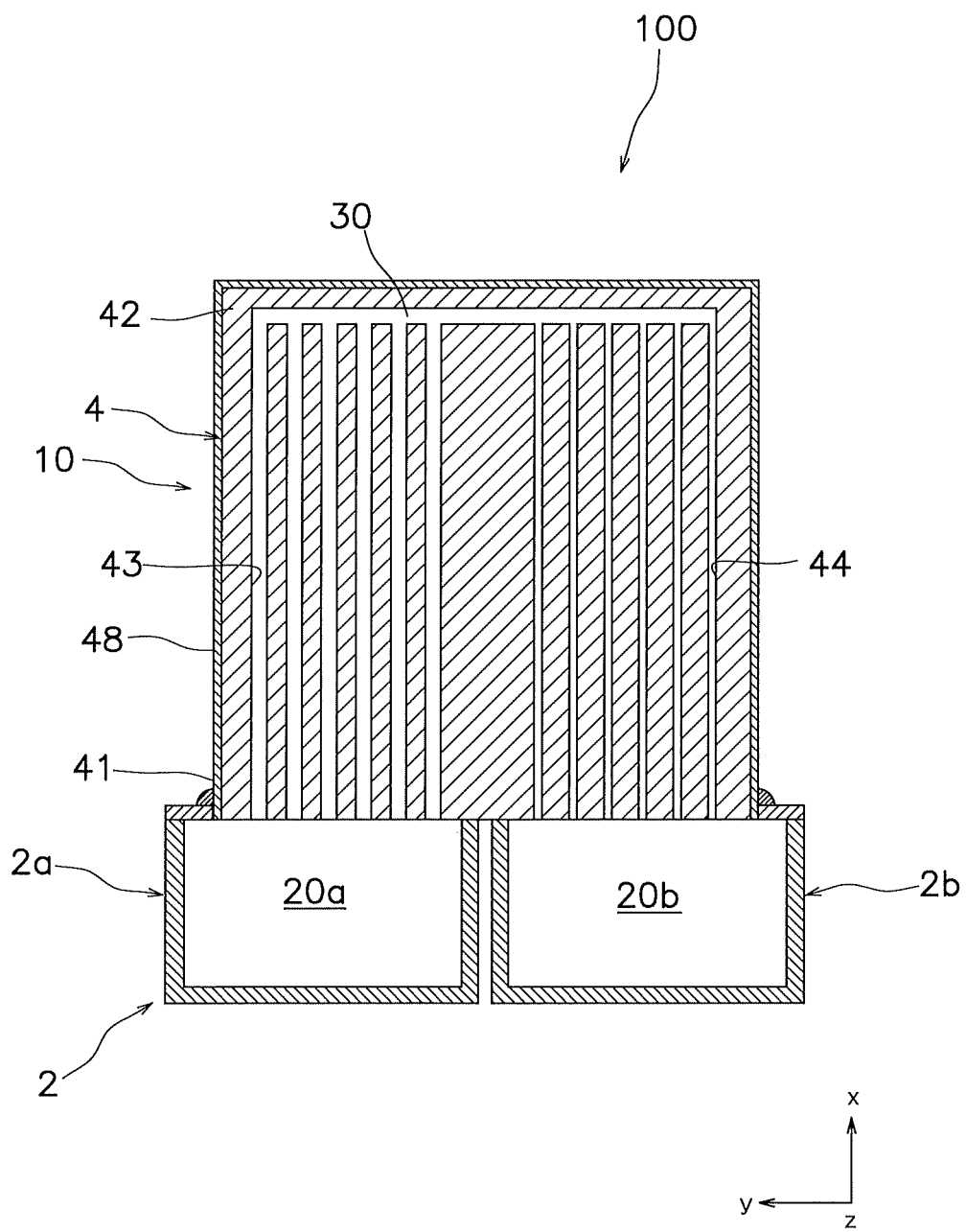
FIG. 9 is a cross-sectional view of a cell stack device according to a variation.

Although the first gas channels 43 and the second gas channels 44 are connected to each other by the connection channel 30 of the connection member 3 in the above-described embodiment, the configuration thereof is not limited thereto. For example, as shown in FIG. 9, the inner portion of the support substrate 4 may include the connection channel 30. In this case, the cell stack device 100 need not include the connection member 3. The first gas channels 43 and the second gas channels 44 are connected to each other by the connection channel 30 formed in the support substrate 4.

Variation 3

The support substrate 4 includes a plurality of first gas channels 43 in the above-described embodiment but may include only one first gas channel 43. Similarly, the support substrate 4 includes a plurality of second gas channels 44 but may include only one second gas channel 44.

Variation 4

Although the first and second top plates 21a and 21b of the manifold 2 are oriented upward and the first and second bottom plates 22a and 22b are oriented downward in the above-described embodiment, the orientation of the manifold 2 is not limited thereto. For example, the first and second top plates 21a and 21b of the manifold 2 may be oriented downward and the first and second bottom plates 22a and 22b may be oriented upward. In this case, the fuel cells 10 extend downward from the first and second top plates 21a and 21b.

Variation 5

Although the fuel cells 10 of the above-described embodiment are so-called horizontal-stripe type fuel cells in which the power generation element portions 5 are arranged in the length direction (the X-axis direction) of the support substrate 4, the configuration of the fuel cells 10 is not limited thereto. For example, the fuel cells 10 may be so-called vertical-stripe type fuel cells in which one power generation element portion 5 is supported on the first main surface 45 of the support substrate 4. In this case, one power generation element portion 5 may be or need not be supported on the second main surface 46 of the support substrate 4.

Variation 6

Although an electrochemical cell is used as a solid oxide fuel cell (SOFC) in the above-described embodiment, the present invention is not limited thereto. For example, an electrochemical cell can also be used as a solid oxide electrolysis cell (SOEC).

The invention claimed is:

1. A manifold for supplying a gas to an electrochemical cell, the electrochemical cell including first and second gas channels that extend from a base end portion to a leading end portion of the electrochemical cell and are connected to each other at the leading end portion, the manifold comprising:
   a first manifold main body including a gas supply chamber that is connected to the first gas channel; and
   a second manifold main body including a gas collection chamber that is connected to the second gas channel; wherein
   the first manifold main body includes a top plate, a first bottom plate, and a first side plate, the top plate includes a first through hole for connecting the first gas channel and the gas supply chamber,
   the second manifold main body includes said top plate, a second bottom plate, and a second side plate, said top plate also includes a second through hole for connecting the second gas channel and the gas collection chamber, and
   the first bottom plate and the second bottom plate are constituted by members that are separate from each other.

2. The manifold according to claim 1, wherein the first through hole and the second through hole are constituted as a single hole.

3. A cell stack device comprising:
   an electrochemical cell; and
   the manifold according to claim 1, the manifold being configured to support the base end portion of the electrochemical cell,
   wherein the electrochemical cell includes
   at least one first gas channel that is connected to the gas supply chamber and extends from the base end portion to a leading end portion of the electrochemical cell, and
   at least one second gas channel that is connected to the gas collection chamber, extends from the base end portion to the leading end portion of the electrochemical cell, and is connected to the first gas channel in the leading end portion of the electrochemical cell.

* * * * *